Dec. 4, 1945.　　　D. T. WILLIAMS　　　2,390,341
GYROSCOPIC POWER TRANSMISSION
Filed Sept. 9, 1943　　　3 Sheets-Sheet 1

Inventor
Dan T. Williams

By
Attorneys

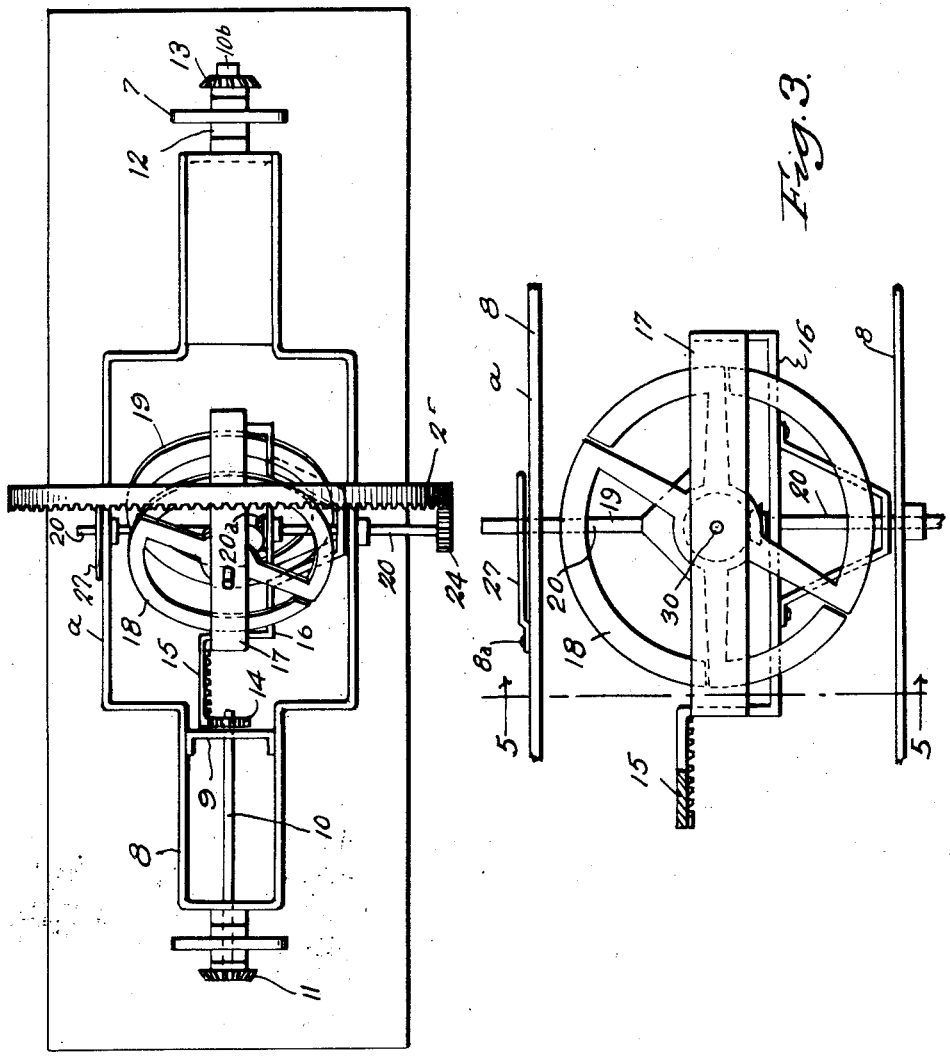

Inventor
Dan T. Williams

Patented Dec. 4, 1945

2,390,341

UNITED STATES PATENT OFFICE 2,390,341

GYROSCOPIC POWER TRANSMISSION

Dan T. Williams, Robinson, Ill., assignor of one-fourth to Gerald W. Miller, Oblong, Ill., and one-sixteenth to Chas. E. Jones, Robinson, Ill.

Application September 9, 1943, Serial No. 501,709

2 Claims. (Cl. 74—5)

This invention relates to new and useful improvements in escapements for time pieces and other moving mechanism, the principal object being to provide a gyroscopic control for accurately releasing energy.

Another important object of the invention is to provide a gyroscopic escapement for time pieces and the like which is self-starting and has no "dead center."

Another important object of the invention is to provide a gyroscopic escapement which has no back lash and which can be used at any altitude and in any temperature.

Other important objects and advantages of the invention will become apparent to the reader of the following description.

In the drawings—

Figure 2 is a top plan view.

Figure 3 is a cross sectional view.

Figure 1:
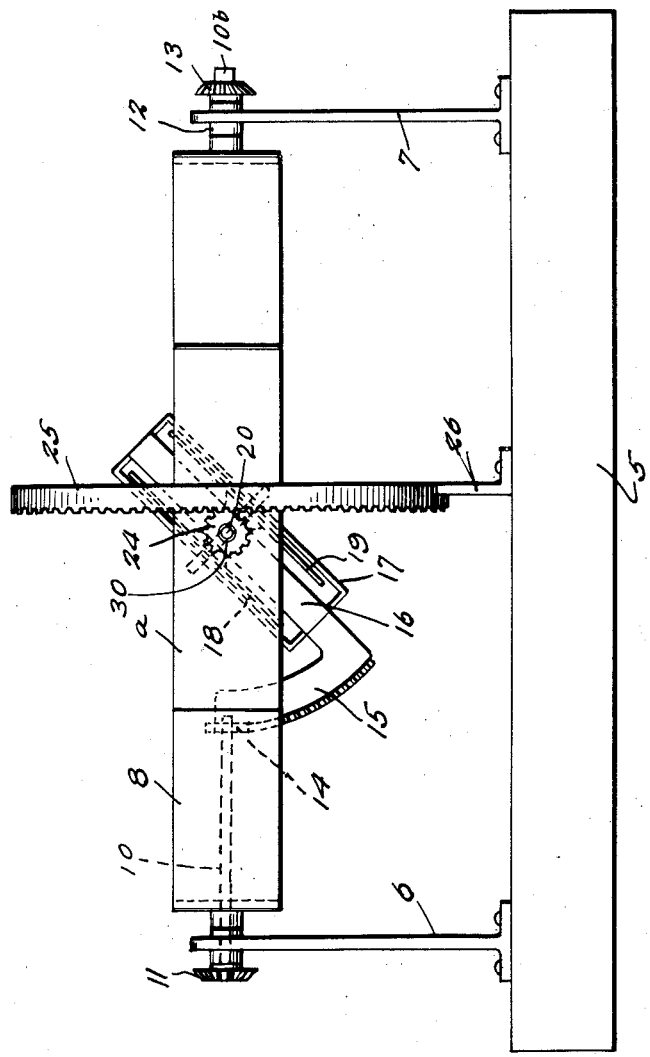
Figure 1 is a side elevational view of the escapement.
Figure 4:
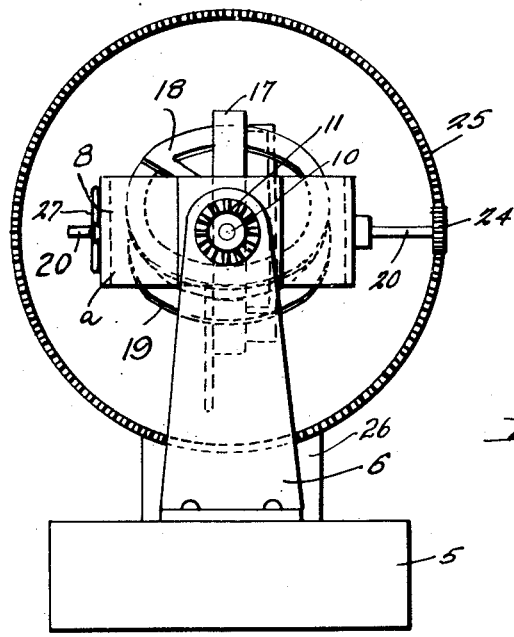
Figure 4 is an end elevation view looking at the power input side of the device.

Referring to the drawings wherein like numerals designate like parts, it can be seen that the device may have a suitable base or panel 5 on which are uprights 6, 7. Numeral 8 denotes an elongated main frame having an enlarged intermediate portion $a$, one end of this frame having a cross member 9 (see Figure 2) to accommodate one end of a shaft 10 which extends through the adjacent end of the frame 8 and is equipped with an input gear 11 with which the main spring of a watch or other power source is geared. The shaft 10 extends through the upright 6 and thus supports one end of the main frame 8.

The other end of the main frame 8 has a shaft extension 10, which passes through a bearing 12 in the upright 7 and is equipped with an input gear 13 from which the power is taken.

The inner end of the shaft 10 is equipped with a gear 14 which meshes with a segmental gear 15 and this segmental gear 15 is supported by an arm 16 on which is secured a bracket or inner frame 17. Within the frame or bracket 17 are mounted a pair of parallel disks or wheels 18, 19 which are adapted to rotate in opposite directions.

Figure 5:
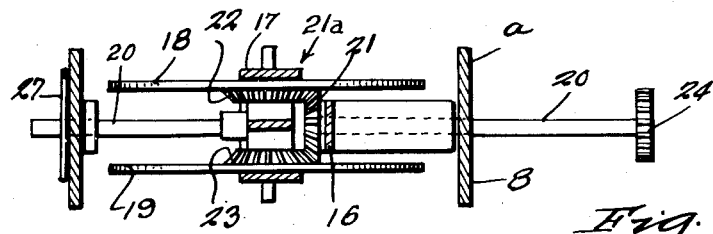
Figure 5 is a section taken on the line 5—5 of Figure 3.
Figure 6:
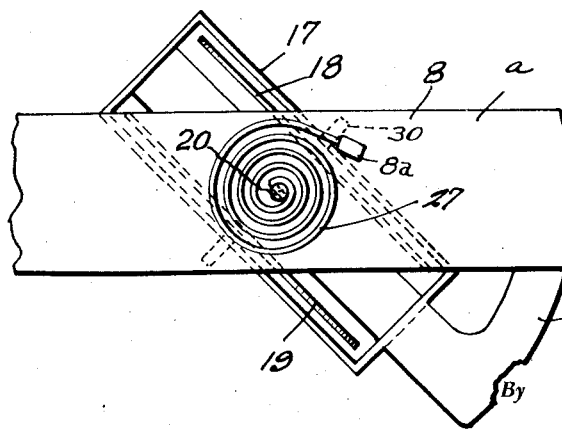
Figure 6 is a fragmentary side elevational view looking at the opposite side from that shown in Figure 1.

The inner frame or bracket 17 is supported by a stub shaft 30, Figure 5, which carries a bevel gear 23 and extends through one side of the inner frame or bracket 17. A second shaft 20 extends through the segment arm 16 and through the adjacent side of the frame 8 and at its inner end has a bevel gear 21 which meshes with bevel gears 22, 23 secured on the disks 18 and 19.

The shaft 20, extending through the adjacent side of the frame 8, is equipped with a gear 24 meshing with the teeth of a stationary ring gear 25 which circumscribes the frame 8 and is supported and secured by a suitable bracket or standard 26 on the base or panel 5.

A coiled spring 27 has one end secured to the shaft 20 and the other end anchored as at 8$a$ to the adjacent side of the frame 8.

Now in describing the operation of the gyroscopic power transmission, it is to be understood that the two small disks 18, 19 are situated in spaced parallel planes and rotate constantly in opposite direction and at the same time their planes of rotation are being proportionately changed in a rotary movement, which change of plane rotation, at normal speed, furnishes a resistance many times greater than the combined weight of the disks and the inner frame or bracket 17. It is preferable that two disks be employed instead of one as this compounds the gyroscope to eliminate any planetary tendencies. The moving part of the transmission has a stabilizing effect built on differential principle, so that when properly balanced, it operates on the second hand (of a clock mechanism) simultaneously with any varied impulse on the rotary resistance, thereby affording isochronism, the degree of which is only limited to the degree of precision building.

The input shaft 10 receives its force from the main spring (not shown) through gear 11 of a clock mechanism or other energy and rotates clockwise, transmitting its power through the segmental gear 15, swinging the entire inner frame or bracket 17 (see Figure 2). It will be observed that the segmental gear 15 is engaged by a gear 14 on the shaft 10. Stationarily disposed around the main frame 8 and supported by the base is the ring gear 25 which meshes with the pinion 24. The pinion 24 is secured on the shaft 20 and in operation serves to actuate a differential 21$a$ turning the disks 18, 19, the differential involving the gears 21, 22 and 23. (See Figure 5.) The disks through the agency of this differential are operated in opposite directions to each other, thus compounding the gyroscopic action.

On one side of the main frame 8 is shown a spring 27 having its ends secured, respectively, at 8$a$ on the frame 8 and on shaft 20, adjustable as to tension for regulating the retardation of the mechanism by slightly changing the degree of angle of the oppositely rotating disks 18, 19.

Through the above mechanism, the output gear 13 runs at uniform speed regardless of the tension of the clock main spring.

Any sudden increase in input power on the shaft 10 would jerk segment 15 and bracket 17, changing the angle of plane of rotation of the disks 18, 19 to provide greater resistance and at the same time operate through the differential 21a to absorb any extra speed before it reaches the output gear 13. The same effect is produced in reverse, if the input power through gear 11 should be gradually or suddenly diminished.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A gyroscopic power transmission of the character described comprising a power input element, a power output element, a main frame carrying said input and output elements in axial alignment, a stationary gear adjacent to which the frame rotates, a separate assembly including a shaft revolubly restrained and positioned across the main frame, means operable in response to relative rotation between the frame and the stationary gear, to operate the separate assembly, a gyroscopic unit controlled by said separate assembly and a segmental gear carried by the gyroscopic unit and geared to the power input element for changing the plane of rotation of the gyroscopic unit at the occurrence of any variance in the speed of the input element.

2. A gyroscopic power transmission of the character described comprising a power input element, a power output element, a main frame carrying said input and output elements in axial alignment, a stationary gear adjacent to which the frame rotates, a separate assembly including a shaft revolubly restrained and positioned across the main frame, means operable in response to relative rotation between the frame and the stationary gear, to operate the separate assembly, a gyroscopic unit controlled by said separate assembly and a segmental gear carried by the gyroscopic unit and geared to the power input element for changing the plane of rotation of the gyroscopic unit at the occurrence of any variance in the speed of the input element, said gyroscopic unit being composed of a pair of rotary elements, rotating in opposite directions in parallel planes and operated by said separate assembly, and said shaft restraining consisting of resilient means between said stationary gear and the main frame adjustable for changing the angularity of said elements.

DAN T. WILLIAMS.